United States Patent [19]
Tayloe et al.

[11] Patent Number: 5,790,954
[45] Date of Patent: Aug. 4, 1998

[54] METHODS OF REQUESTING VOLUNTEERS FOR HANDOFF IN A CELLULAR SYSTEM

[75] Inventors: Daniel Richard Tayloe, Phoenix; Victor Hawes Cutler, Jr., Mesa, both of Ariz.; Gerald Joseph Davieau, Eldersburg, Md.

[73] Assignee: Motorola, Inc., Schaumburg, Ill.

[21] Appl. No.: 452,758

[22] Filed: May 30, 1995

[51] Int. Cl.[6] .............................. H04Q 7/20; B04B 7/185
[52] U.S. Cl. .......................... 455/437; 455/12.1; 455/429
[58] Field of Search .................................. 455/33.1, 33.2, 455/33.4, 54.1, 56.1, 12.1, 429, 422, 438, 437, 436, 443, 517, 524; 379/60

[56] References Cited

U.S. PATENT DOCUMENTS

| | | | |
|---|---|---|---|
| 5,101,501 | 3/1992 | Gilhousen et al. | 455/33.2 |
| 5,406,615 | 4/1995 | Miller, III et al. | 455/33.2 |
| 5,465,389 | 11/1995 | Agrawal et al. | 455/33.2 |
| 5,483,664 | 1/1996 | Moritz et al. | 455/12.1 |
| 5,533,014 | 7/1996 | Willars et al. | 455/33.2 |
| 5,548,806 | 8/1996 | Yamaguchi et al. | 455/56.1 |

*Primary Examiner*—Edward F. Urban
*Assistant Examiner*—Sam Bhattacharya
*Attorney, Agent, or Firm*—Harold C. McGurk

[57] ABSTRACT

A cellular communication system (10) requests from subscriber units (30) to volunteer for handoff when a call resource shortage is about to occur. The subscriber units (30) may volunteer to handoff to another cell (24) depending on whether any adjacent or neighbor cell (24) provides adequate signal strength for servicing the on-going call. If there is another adjacent or neighbor cell (24) which provides adequate signal strength, the subscriber unit (30) can volunteer for handoff to the other cell. The cellular communication system (10) may accept the volunteer handoff request, whereby the subscriber unit (30) volunteering for handoff is handed-off to the other cell (24). However, the cellular communication system (10) may deny the handoff request. If the handoff request is denied, the subscriber unit (30) may have to drop the call or try to locate another cell to handoff its call before a predetermined amount of time expires.

6 Claims, 5 Drawing Sheets

FIG. 5 they can include data terminals, facsimile machines, etc. However, for purposes of this discussion, subscriber units 30 are described in terms of portable cellular telephones.

METHODS OF REQUESTING VOLUNTEERS FOR HANDOFF IN A CELLULAR SYSTEM

TECHNICAL FIELD

This invention relates generally to telecommunication methods and, in particular, to methods for requesting volunteers to handoff to other, available channels to reduce the amount of dropped calls in a cellular system.

BACKGROUND OF THE INVENTION

Conventional terrestrial cellular systems control when and how subscriber units are handed-off from one cell to another cell. When this occurs is usually based on a number of factors, including for example, the number of call resources available for a particular cell, signal strength of adjacent cells and the location of the subscriber unit. Terrestrial cellular systems identify such subscriber units and transmit a message to inform such subscriber units to handoff to another cell (if it can).

"Load shedding" is the technique by which a terrestrial cellular system has knowledge of which subscriber units could be moved to other cells, and informs those subscriber units (which are able to handoff to another cell) to handoff to the next cell. Since most terrestrial cellular systems have knowledge of the handoff situation of its subscriber units, the terrestrial system can move calls at the edge of the current cell to other cells. Handing-off calls to other cells increases call capacity for the current cell which may be experiencing a heavy call demand.

Satellite cellular systems are markedly different than terrestrial cellular systems because the satellites usually do not have knowledge of the handoff situation of its subscriber units. This is because the satellites do not have the processing power needed to track the subscriber units' handoff situation. The subscriber units usually determine for themselves when a handoff is needed. Satellite cellular systems are therefore unable to perform any of the load shedding techniques used by terrestrial cellular systems.

In satellite cellular systems, the number of call resources allocated to different cells are constantly changing. Situations regularly arise where the channel resources on a particular cell are changed to a new set of reduced channel resources. As a result, some calls may have to be dropped. Moreover, sometimes a new cell needs to be made available when no more hardware capacity exists. At such times, the call capacity needs to be taken from another cell, and calls may have to be dropped.

Accordingly, there is a significant need for a method of reducing or eliminating dropped calls in a satellite cellular system where the satellites have no knowledge of the subscriber units' handoff situation and the number of call resources are dynamically changing.

DESCRIPTION OF THE PREFERRED EMBODIMENTS

A "satellite" as used throughout this description means a manmade object or vehicle intended to orbit a celestial body such as earth. The term "satellite" is intended to include both geostationary and orbiting satellites and/or combinations thereof including low-earth or medium-earth orbiting satellites. The word "earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have an equal number of satellites in each plane, although this is not essential. The terms "cell" and "antenna pattern" are not intended to be limited to any particular mode of generation and include those created by either terrestrial or satellite cellular communication systems and/or combinations thereof.

Figure 1:
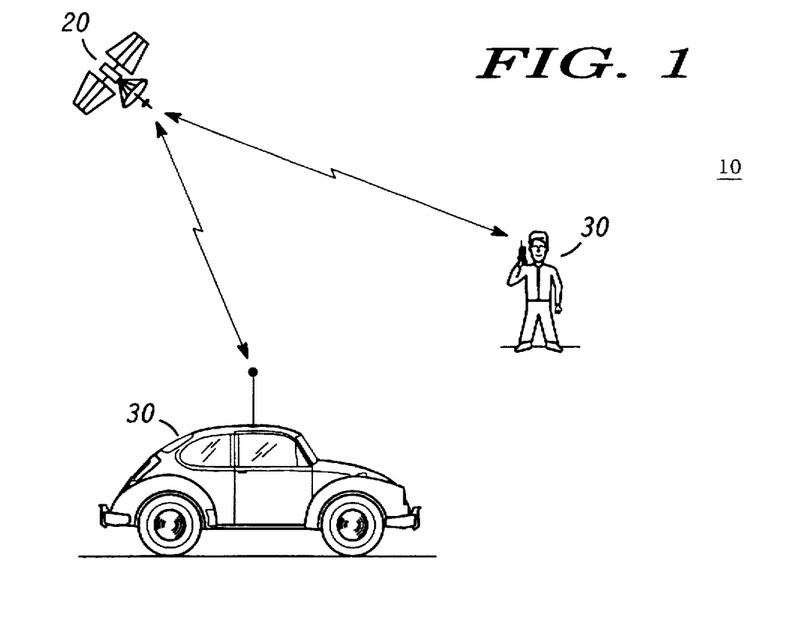
FIG. 1 shows an overview of a satellite cellular system in accordance with a preferred embodiment of the present invention.

FIG. 1 shows an overview of a satellite cellular system in accordance with a preferred embodiment of the present invention. Although FIG. 1 illustrates a highly simplified diagram of satellite cellular system 10, system 10 is dispersed over and surrounding earth through use of orbiting satellites 20. The present invention is applicable to satellite cellular systems having satellites 20 in low-earth, medium-earth or geosynchronous orbits. Additionally, it is applicable to satellite cellular systems 10 having satellites 20 which orbit earth at any angle of inclination (e.g., polar, equatorial or another orbital pattern).

Satellite cellular system 10 comprises at least one satellite 20 and any number of subscriber units 30. Satellite 20 is preferably a satellite in low-earth orbit around earth. Satellite 20 may be a single satellite or part of a constellation of satellites orbiting earth, like the IRIDIUM® project which has a constellation of sixty-six satellites in a low earth orbits. While the present invention is advantageously employed when a large number of satellites are being used, it is also applicable with as few as a single satellite.

The methods described herein are also applicable to satellite constellations where full coverage of earth is not achieved (i.e., where there are "holes" in the communications coverage provided by the constellation) and to satellite constellations where plural coverage of portions of the earth occur (i.e., more than one satellite is in view of a particular point on earth's surface).

Satellite 20 communicates with subscriber unit 30 using frequency-division multiplexing (FDM), time-division multiplexing (TDM), code-division multiplexing (CDM), or a combination of these. A combination is assumed when the uplink and downlink signals are transmitted in bursts or packets on selected frequencies at specific time opportunities (time slots). However, other methods may be used as known to those of ordinary skill in the art. How satellite 20 transmits data (or calls) to and receive data from subscriber units 30 is well known to those of ordinary skill in the art.

Subscriber units 30 may be located anywhere on the surface of earth or in the atmosphere above earth (e.g., in an jet). Subscriber units 30 are preferably communications devices capable of transmitting data to and receiving data from satellites 20. By way of example, subscriber units 30 may be pagers or hand-held, portable cellular telephones adapted to communicate with satellites 20. Ordinarily, subscriber units 30 need not perform any control functions for satellite cellular system 10. Satellite cellular phones are preferred if they can transmit to and receive from satellite 20. Subscriber units 30 may also be a dual mode cellular telephone which can transmit to and receive from satellite 20 and terrestrial cellular systems or equipment. Remote units 30 comprise hardware which is well known to those of ordinary skill in the art. How subscriber units 30 transmit data (or calls) to and receive data from satellites 20 is well known to those of ordinary skill in the art.

Satellite cellular system 10 may accommodate any number of subscriber units 30. In the preferred embodiment of the present invention, subscriber units 30 communicate with nearby satellites 20 via subscriber links. Subscriber links are a limited portion of the electromagnetic spectrum that is divided into numerous channels (e.g., ring-alert channels, broadcast channels, acquisition channels and traffic channels). Subscriber links are preferably combinations of L-Band and/or K-Band frequency channels and may encompass Frequency Division Multiple Access (FDMA) and/or Time Division Multiple Access (TDMA) and/or Code Division Multiple Access (CDMA) communications or any combination thereof.

A traffic channel is a two-way channel that is assigned to a particular subscriber unit 30 by satellites 20 from time to time. A digital format may be used to communicate data over the channels to support real-time communications. At least one traffic channel is assigned for each call, and each traffic channel has sufficient bandwidth to support, at a minimum, a two-way voice or data conversation. To support real-time communications, a time division multiple access (TDMA) scheme is desirably used to divide time into frames, somewhere in the 10-90 millisecond range. Particular traffic channels are assigned particular transmit and receive time-slots, having durations in the 3-10 millisecond range, within each frame. Analog audio signals are digitized so that an entire frame's signal is transmitted or received in a single short high speed burst during an allotted time-slot. Each satellite 20 may support up to a thousand or more traffic channels so that each satellite 20 can simultaneously service a large number of independent calls. Those skilled in the art, however, will recognize that traffic channels can be formed without this time slot structure and that methods that do not require digitizing the analog voice signal may be employed. The precise method used to form the channels and process the voice or data communication is not important to this invention.

Satellites 20 communicate with other nearby or adjacent satellites 20 through cross-links. Thus, a call or communication from subscriber unit 30 located at any point on or near the surface of earth may be routed through the constellation of satellites 20 to within range of substantially any other point on the surface of earth. A communication may be routed down to subscriber unit 30 or near the surface of earth from satellite 20 using the subscriber link. Accordingly, satellite cellular system 10 may establish a communication path for relaying data through the constellation of satellites 20 between any two subscriber units 30.

Figure 2:
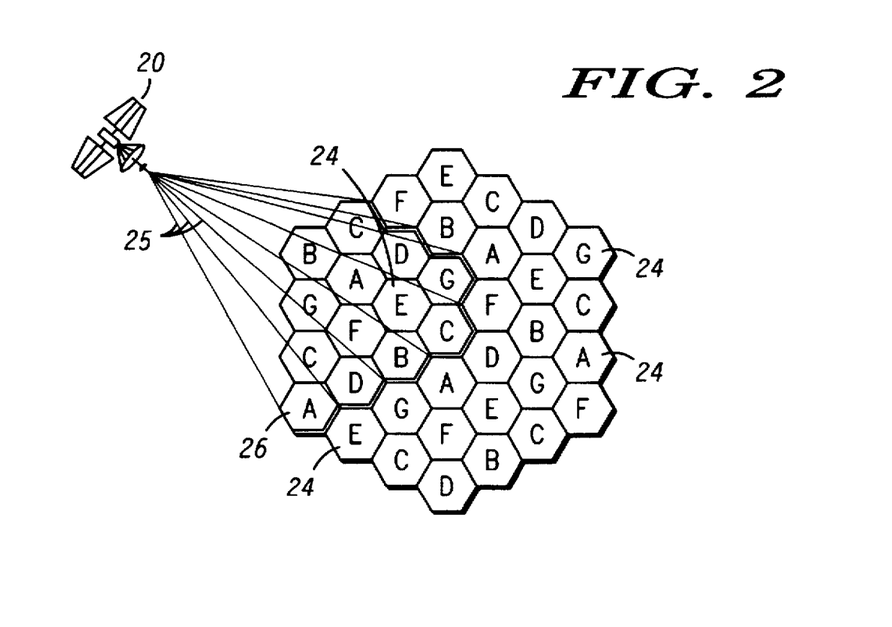
FIG. 2 shows a typical layout diagram of a cellular antenna pattern projected by satellites onto the surface of earth in accordance with a preferred embodiment of the present invention.

FIG. 2 shows a typical layout diagram of a cellular antenna pattern projected by satellites 20 onto the surface of earth. Each satellite 20 includes an array (not shown) of directional antennas. Each array projects numerous discrete antenna cells 25 or broadcast channel antenna patterns onto earth's surface at numerous diverse angles. FIG. 2 shows a diagram of a resulting pattern of cells 24 that satellites 20 form on the surface of earth. Footprint region 26, which is bounded by a double line in FIG. 2, results from antenna cells 25 produced by an antenna array of one satellite 20. Cells 24 which reside outside of region 26 are produced by antenna arrays from other satellites 20.

Each antenna pattern 25 is approximately 500-600 miles in diameter and moves across the surface of earth at a rate of approximately 110 miles in thirty seconds. Antenna patterns 25 are shown as hexagons for convenience only. It is well known to those of ordinary skill in the art that antenna patterns 25 may be other shapes as well. For example, in the case where antenna patterns 25 are transmitted from satellites 20, some antenna patterns 25 may be elliptical, elongated elliptical or circular in shape depending on the angle incident to the surface of the earth. The particular shape of the antenna pattern is not important to the present invention. Although not shown in FIG. 2, antenna patterns 25 may overlap. Those of skill in the art will understand that antenna patterns 25 generally represent regions where a signal level associated with a cell is greater than some predetermined level, and outside that region, the signal level is less than that predetermined level.

In the preferred embodiment, antenna patterns move over the surface of the earth while subscriber units 30 remain relatively stationary. In the preferred embodiment, this motion is caused by the motion of satellites 20 which transmit the channels. The motion of the antenna patterns 25 from the equator to the poles creates overlap of antenna patterns 25 between adjacent satellites 20. As overlap occurs, some channels are desirably turned off to prevent interference between overlapping antenna patterns 25.

Subscriber units 30 initially determine which cell to communicate with based on the signal level or signal quality of broadcast channels received at subscriber unit 30. For example, subscriber unit 30 located within a center region of a cell would most likely choose to communicate over a channel associated with this cell because the broadcast channel signal level of a cell is generally the greatest in the center region. If subscriber unit 30 is located within the region where two antenna patterns or cells 24 overlap, subscriber unit 30 may choose from either cell to communicate with because the broadcast channel signal levels are generally similar.

Assignments of traffic channels are valid only for as long as subscriber unit 30 remains within the cell. Generally, based on the movement of satellites 20, this period is approximately 30 seconds. New traffic channel assignments must be established every period. Because of the fast moving antenna patterns, it is desirable for subscriber units 30 to monitor the broadcast channels of adjacent cells that are candidates for handoff.

FIG. 2 also illustrates an assignment of channel sets to cells 24 in accordance with a division of the spectrum into seven discrete channel sets. The precise number of channel sets into which the spectrum used by satellites 20 is divided is not important to the present invention. FIG. 2 references the seven discrete channel sets through the use of the characters "A", "B", "C", "D", "E", "F", and "G". Those skilled in the art will appreciate that a different number of channel sets, for example twelve, may be used and that, if a different number is used the resulting assignment of channel sets to cells 24 will differ from the assignment pattern depicted in FIG. 2. Likewise, those skilled in the art will appreciate that each channel set may include one channel or any number of orthogonal channels. As illustrated in FIG. 2, the assignment of channel sets to cells 24 allows the limited spectrum to be reused in geographically spaced apart cells 24. In other words, non-orthogonal channel sets simultaneously carry communications without interference because the cells 24 where the non-orthogonal channel sets are used are spaced apart from one another and do not overlap. Moreover, each footprint region 26 is capable of operating with any of the discrete channel sets, and the particular channel set used at any particular time by any particular subscriber unit 30 is controlled by satellite cellular system 10.

While the specific communication technique (i.e. how the call is transmitted) is not important for the present invention, those of skill in the art will understand that any one or combination of the above described communication techniques (e.g., TDMA, FDMA, CDMA, etc.) can be used in the present invention.

Figure 3A:
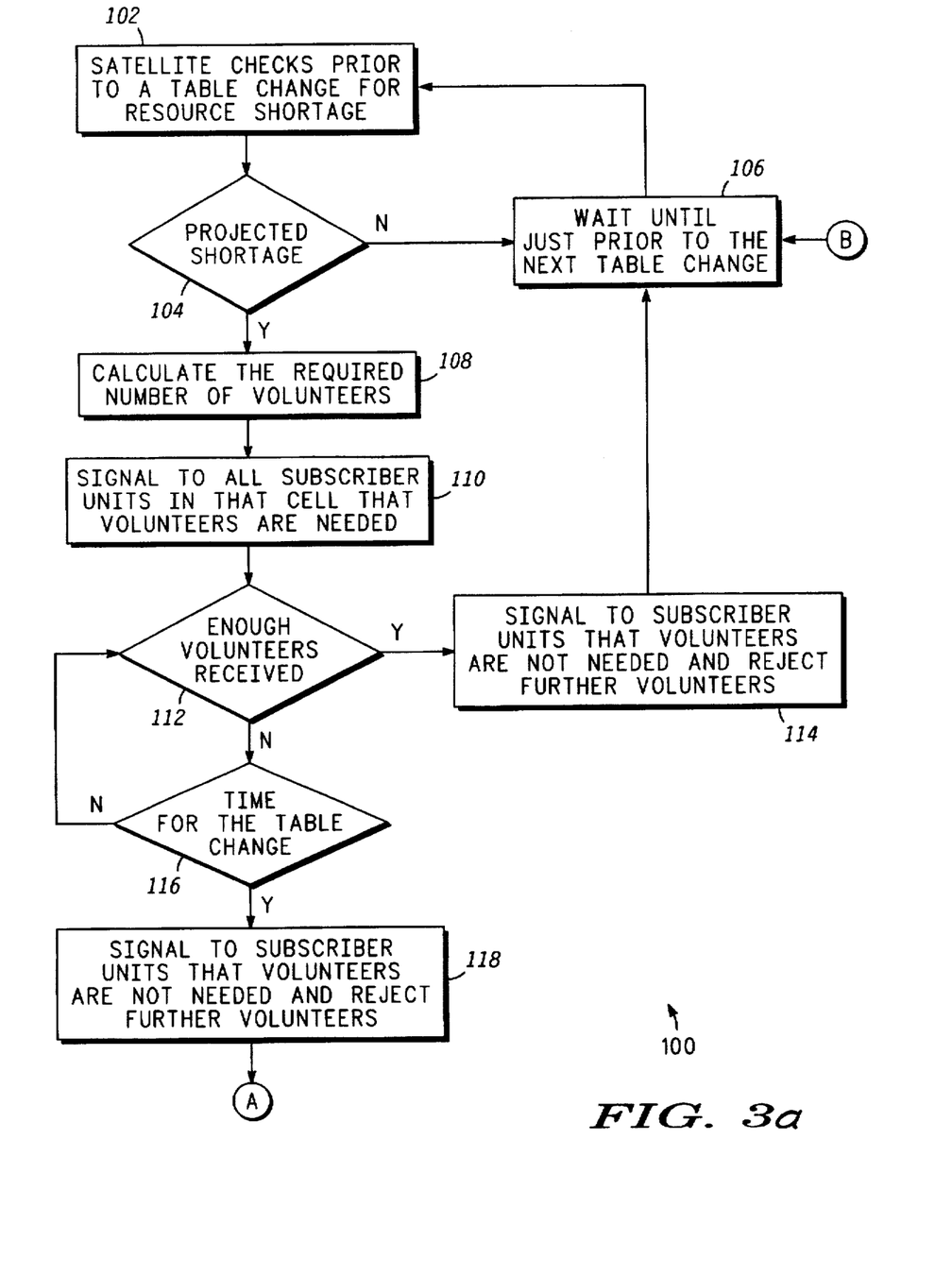
FIG. 3 shows a flowchart of a handoff volunteer method in accordance with a preferred embodiment of the present invention.
Figure 3B:
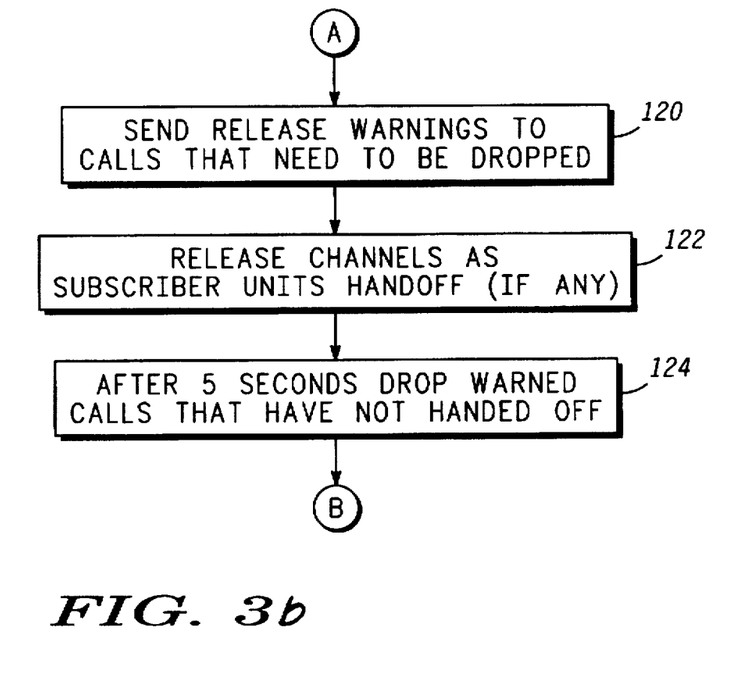

FIG. 3 shows a flowchart of handoff volunteer method 100 in accordance with a preferred embodiment of the present invention. Method 100 may be executed by satellite 20, a satellite in a constellation of satellites or by any terrestrial cellular system. An overview of the flowchart in FIG. 3 is discussed first followed by a detailed discussion of each of the steps shown in FIG. 3. It is assumed that satellite(s) 20 or the terrestrial cellular system does not have any knowledge of the handoff situation or requirements of subscriber units 30. Method 100 predicts a predetermined amount of time before a resource or call capacity reduction will occur, that will cause some calls to either be dropped or moved to another cell, whether any subscriber unit 30 being serviced by that particular cell wants to volunteer for handoff from the current cell to another cell. All subscriber units 30 under the current cell will then determine whether they can handoff to other candidate cells which have little or no signal degradation for a successful handoff and which can service the on-going call. All subscriber units 30 that can handoff to another cell transmit to satellite 20 a handoff request message volunteering for a volunteer handoff. Satellite 20 then accepts as many of these volunteer handoff requests as are needed to compensate for the resource or call allocation problem. Satellite 20, however, rejects any volunteer handoff request which exceeds the maximum number of handoff volunteers that are needed.

As shown in FIG. 3, satellite 20 checks in step 102 whether a resource shortage is going to occur. A resource shortage is indicated in a variety of ways. In the preferred embodiment, a table change indicates whether a resource shortage is going to occur. A table change is a time-tagged event or an event occurring at predetermined times that indicates, for example, whether the cell's call capacity is going to change (increase or decrease). The check may occur at a predetermined amount of time before the table change. Although five seconds is preferred, there needs to be enough time for requesting handoff volunteers, accepting the handoff volunteers and handing-off calls to other cells. A resource reduction may also be indicated by a reduction in the number of available channels (e.g., a frequency and time-slot). The call capacity resources of the cells of satellites 20 may be changing due to a variety of factors. There are other ways of indicating whether a resource shortage is to occur that are well known to those of ordinary skill in the art.

If satellite 20 determines in step 104 that there will not be a projected shortage in call or channel resources, satellite 20 waits in step 106 until just prior to the next table change before determining in step 102 whether there will be a call resource shortage. Steps 102, 104 and 106 will repeat until satellite 20 determines that there will be a call resource shortage. If a call resource shortage is determined to occur, satellite 20 then calculates in step 108 a number of volunteers that are needed to handoff to another cell before the resource shortage occurs. This calculation may involve, for example, subtracting the number of calls the cell is currently servicing from the call resource capacity of the same cell at some future time. This number represents the number of calls that need to be transferred to another cell or dropped because the current cell will be unable to handle all of the calls at a future time. Another way to determine a call resource shortage is whether a reduction in the number of available channels is less than the number of channels needed.

Once the number of volunteers for handoff is calculated, satellite 20 signals for volunteers in step 110 to all subscriber units 30 in the current cell. Volunteers are those subscriber units 30 which can handoff to another cell, whether it is a cell having a strong signal strength. Subscriber units 30 that most likely would volunteer for handoff are those subscriber units 30 at the edge of a cell. Satellite 20 may signal subscriber unit 30 in many ways; one being, for example, setting a bit or word in link control information that is passed between satellite 20 and subscriber units 30 to indicate that volunteers are needed. If subscriber unit 30 determines that it may want to be a volunteer (according to the flowchart shown and described in FIG. 4), subscriber unit 30 notifies satellite 20 and satellite 20 performs the necessary handoff. The handoff process includes transferring communication from the current cell (and channel) to another cell which can handle or service the call. The handoff process and the steps for transferring a call from one cell to another cell are well known to those of ordinary skill in the art.

In step 112, satellite 20 determines whether enough volunteers are received. If enough subscriber units volunteered for handoff, satellite 20 stops notifying subscriber units 30 that volunteers are needed and rejects any further volunteers. Method 100 proceeds to step 106 to wait a predetermined time before the next table change and eventually to step 102. If there are not enough subscriber units 30 that volunteered for handoff in step 112, satellite 20 determines in step 116 whether a table change will occur. If a table change is not ready to occur, satellite 20 will again determine in step 112 whether enough subscriber units volunteered for handoff to another cell. Step 116 and steps 112 will repeat until enough subscriber units 30 volunteered, or a table change occurred or is about ready to occur.

Figure 5:
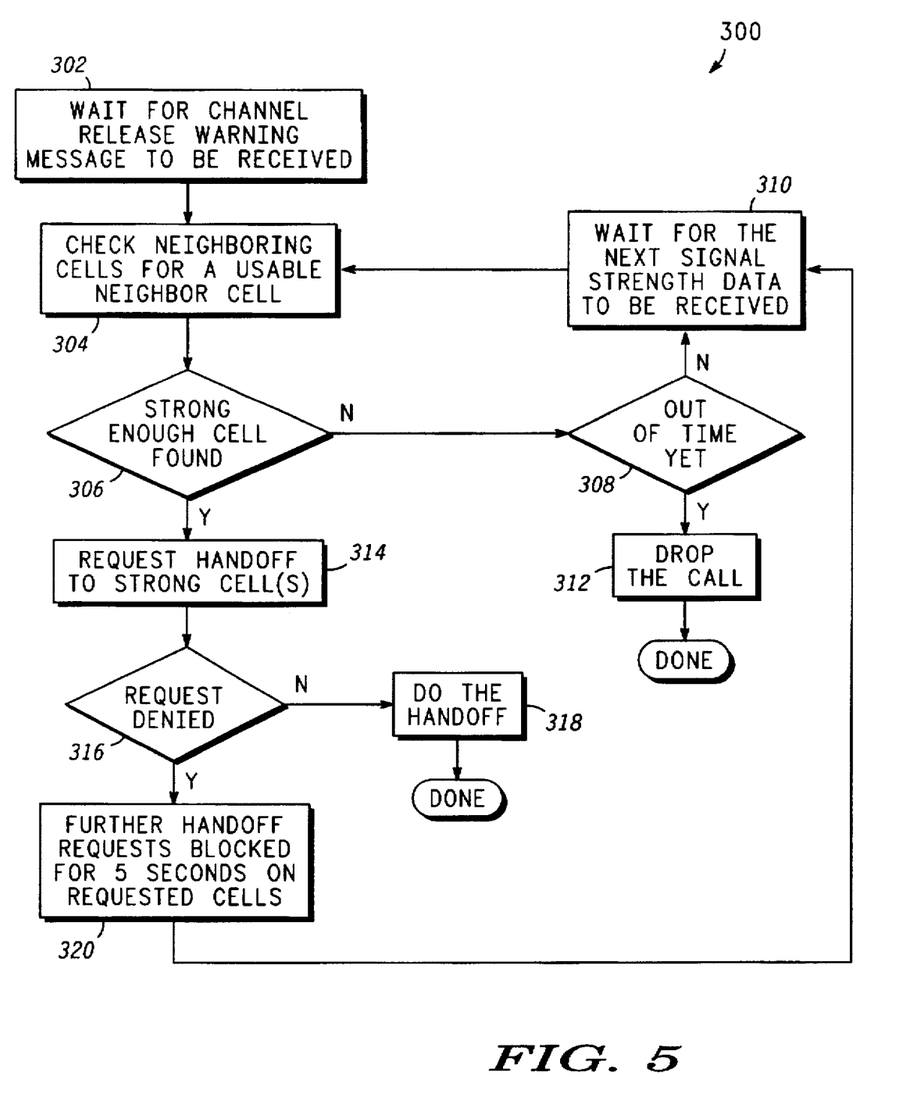
FIG. 5 shows a flowchart of a channel release method in accordance with a preferred embodiment of the present invention.

If a table change occurred or is about ready to occur, satellite 20 will stop notifying subscriber units 30 in step 118 that volunteers are needed. Next, satellite 20 will send to subscriber units 30 in step 120 a release warning to a set of subscriber units 30 their calls will have to be dropped. The subscriber units 30 may still have time to handoff their calls to another cell as discussed in relation to the flowchart shown in FIG. 5. If subscriber units 30 handoff to another "strong enough" cell (as shown in FIG. 5), the channels are released in step 122 when the handoff is performed. After a predetermined amount of time, preferably around five seconds, satellite 20 drops or releases warned calls in step 124 of subscriber units 30 that have not handed-off that their calls to another cell. Method 100 proceeds to step 106 to wait until the predetermined time period prior to the next table change before repeating the method for requesting volunteers for handoff.

Figure 4:
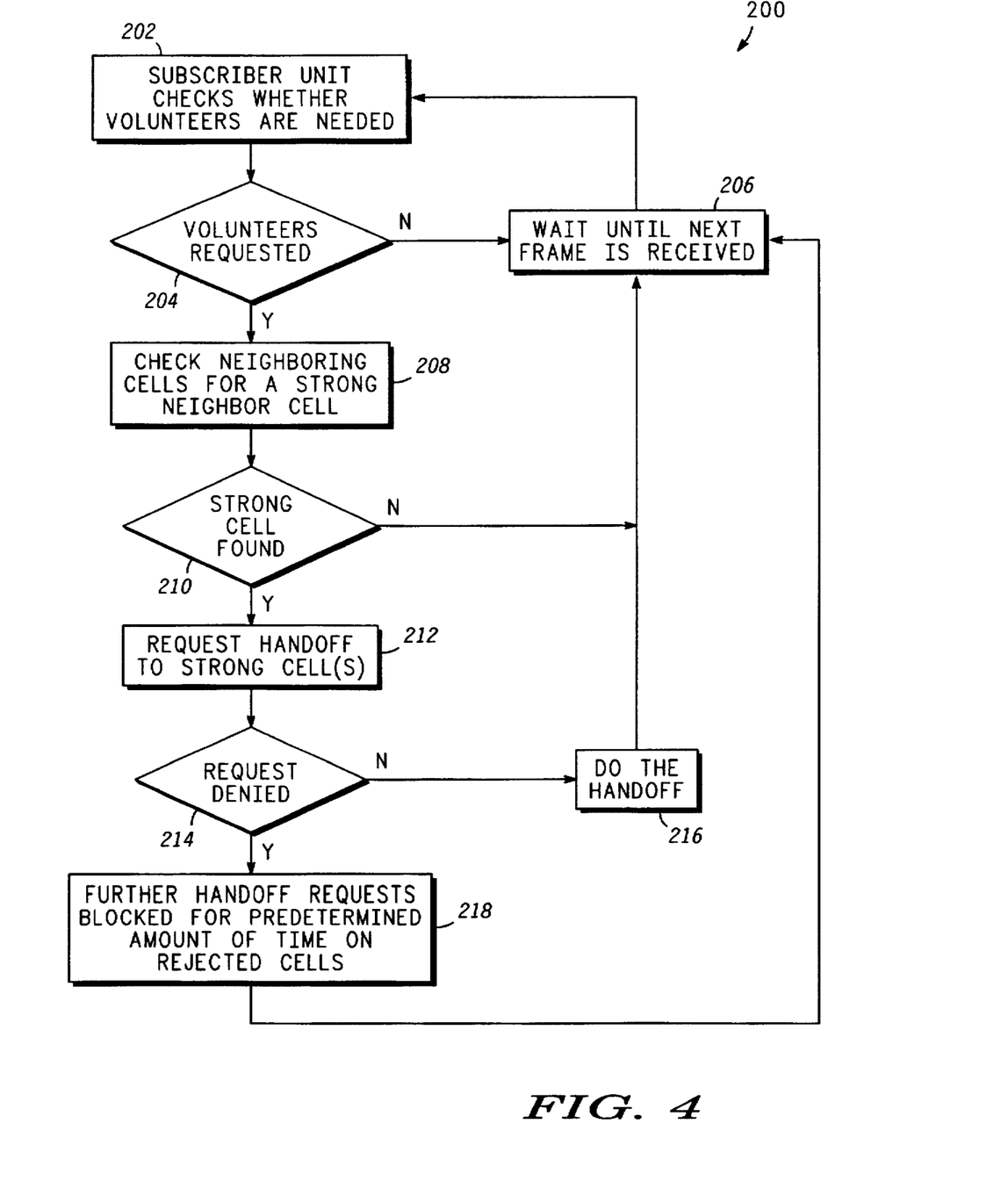
FIG. 4 shows a flowchart of a handoff volunteer method executed by a subscriber unit in accordance with a preferred embodiment of the present invention.

FIG. 4 shows a flowchart of volunteer handoff method 200 executed by a subscriber unit 30 in accordance with a preferred embodiment of the present invention. As shown in FIG. 4, subscriber unit 30 checks in step 202 whether satellite 20 (or a terrestrial station in a terrestrial cellular system) is requesting volunteers for handoff. Subscriber unit 30 may determine whether satellite 20 is making this request by checking volunteer indication information in a link control word which is sent between satellite 20 and subscriber unit 30. The link control word is sent from satellite 20 approximately every ninety milliseconds; however, other time periods may be used as well.

Subscriber unit 30 determines in step 204 whether satellite 20 is requesting volunteers for handoff. Although satellite 20 is preferred for transmitting the request for volunteers, terrestrial stations in a terrestrial cellular system may also transmit the request for handoff volunteers. If satellite 20 is not requesting volunteers for handoff in step 204, subscriber unit 30 then waits in step 206 until the next frame is received from satellite 20. A "frame" means a packet of data which includes control link information (e.g., bit(s) or word(s) indicating volunteers for handoff are needed) and may also include voice or data packets. Steps 202, 204 and 206 will be executed by subscriber unit 30 until it determines that satellite 20 is requesting volunteers for handoff.

If satellite 20 is requesting volunteers for handoff in step 204, subscriber unit 30 checks in step 208 for any strong neighbor cells. A strong neighbor cell is a cell that provides sufficient signal strength so that there no degradation in the signal quality between satellite 20 and subscriber unit 30. If a strong cell is not found in step 210, method 200 returns to step 206 where subscriber unit 30 waits for the next frame sent by satellite 20. If a strong cell is found in step 210, subscriber unit 30 requests a handoff from the current cell to the strong neighbor cell found in step 210. The handoff request is made by subscriber unit 30 to satellite 20 via link control information, for example.

Satellite 20 may accept or deny the handoff request in step 214 made by subscriber unit 30 in step 212. If satellite 20 accepts the handoff request, the handoff from the current cell to the selected adjacent or neighbor cell will be performed. Techniques for performing the handoff are well known to those of ordinary skill in the art. Method 200 returns to step 206 where subscriber unit 30 waits for the next frame sent from satellite 20 to subscriber unit 30.

If the request is denied in step 214 by satellite 20, subscriber unit 30 stops sending the handoff request to satellite 20 for a predetermined amount of time. Since the subscriber unit 30 essentially is controlling when the handoff requests are sent, this helps eliminate any processing required by satellite 20 in continuously denying the request. This way satellite 20 is free to process other tasks rather than continuously denying the handoff request. The predetermined amount of time is preferably five second, even though other time periods may be used as well. After step 218, method 200 returns to step 206 where subscriber unit 30 waits for transmission of the next frame sent by satellite 20.

FIG. 5 shows a flowchart of a channel release method in accordance with a preferred embodiment of the present invention. As shown in FIG. 5, subscriber unit 30 waits in step 302 for receipt of a channel release warning message. This message is sent by satellite 20 in step 120 of FIG. 1 by satellite 20. Subscriber unit 30 checks in step 304 for any neighboring cells that are "strong enough" to support or provide communication between satellite 20 and subscriber unit 30. "Strong enough" means that the signal quality may have some degradation, but the signal quality is still adequate enough to support the call between satellite 20 and subscriber unit 30. If subscriber unit 30 does not find a "strong enough" cell in step 306, subscriber unit 30 checks in step 308 for whether there is any more time to try to find another "strong enough" cell before the call is dropped. If there more time, subscriber unit 30 waits in step 310 for receipt of the next signal strength data or information. If there is not enough time, method 300 drops the call in step 312 and method 300 ends. How a call is dropped in well known to those of ordinary skill in the art.

As shown in FIG. 5, if subscriber unit 30 finds a "strong enough" cell in step 306, subscriber unit 30 makes a request to satellite 20 to perform the handoff to the "strong enough" cell in step 314. If satellite 20 accepts the handoff request in step 316, the handoff from the current cell to the "strong enough" cell is performed in step 318 by satellite 20. The call then continues in the "strong enough" cell between subscriber unit 30 and satellite 20. If satellite 20 denies the request in step 316, subscriber unit 30 stops from making further handoff requests for a predetermined amount of time in step 320. Next, method 300 returns to step 310 until receipt of the next signal strength data or information. Method 300 will continue to loop until either the call is dropped in step 312 or a handoff is performed in step 318. Method 300 gives subscriber unit 30 a final opportunity to handoff to another cell which is "strong enough" so that the call is not dropped.

It will be appreciated by those skilled in the art that the present invention provides an opportunity for a subscriber unit to volunteer to handoff to another cell so that no calls are dropped or the number of dropped calls is substantially reduced. Moreover, another advantage of the present invention is that the cellular system can regulate the number of subscriber units 30 that actually move to another cell by having subscriber unit 30 volunteer for handoff, and by having satellite 20 make the decision whether to reject or accept the volunteer handoff request. Yet another advantage of the present invention is to significantly reduce the processing burden on satellites 20 and to transfer the intelligence of when a handoff should occur to subscriber units 30.

Accordingly, it is intended by the appended claims to cover all modifications of the invention which fall within the true spirit and scope of the invention. For example, these methods are applicable to terrestrial cellular systems, although the methods are described in relation to satellite cellular systems 10.

What is claimed is:

1. A method of requesting volunteers for handoff from a plurality of subscriber units, comprising the steps of:

a) determining if a number of volunteers are needed for handoff;

b) waiting a predetermined amount of time if no volunteers are needed for handoff;

c) repeating steps (a) and (b) until volunteers are needed for handoff;

d) signaling to the subscriber units that volunteers for handoff are needed; and e) performing requested handoffs for the subscriber units volunteering for handoff.

2. A method of requesting volunteers for handoff from a plurality of subscriber units, comprising the steps of:

a) determining if a number of volunteers are needed for handoff by determining the number of volunteers for handoff by subtracting a number of channels in use from a number of channels that will be available;

b) signaling to the subscriber units that volunteers for handoff are needed; and c) performing requested handoffs for the subscriber units volunteering for handoff.

3. A method of requesting volunteers for handoff from a plurality of subscriber units, comprising the steps of:

a) determining if a number of volunteers are needed for handoff by determining the number of volunteers for handoff by subtracting a number of calls in use from a number of calls that will be available;

b) signaling to the subscriber units that volunteers for handoff are needed; and c) performing requested handoffs for the subscriber units volunteering for handoff.

4. A method of requesting volunteers for handoff from a plurality of subscriber units, comprising the steps of:

a) waiting until a number of volunteers are needed for handoff;

b) signaling to the subscriber units that volunteers for handoff are needed;

c) performing requested handoffs for the subscriber units volunteering for handoff;

d) determining whether enough of the subscriber units volunteered for handoff;

e) notifying the subscriber units that no more volunteers for handoff are needed if enough of the subscriber units volunteered for handoff; and f) rejecting handoff requests if enough of the subscriber units volunteered for handoff.

5. A method as recited in claim 4, further comprising the steps of:

a) waiting until a number of volunteers are needed for handoff;

b) signaling to the subscriber units that volunteers for handoff are needed;

c) performing requested handoffs for the subscriber units volunteering for handoff;

d) determining whether enough of the subscriber units volunteered for handoff;

e) repeating steps (c) and (d) until either enough of the subscriber units volunteered for handoff or a resource reduction occurs; and f) notifying the subscriber units that no more volunteers for handoff are needed after enough of the subscriber units volunteered for handoff or the resource reduction is going to occur after a predetermined amount of time.

6. A method for determining whether to volunteer for handoff, comprising the steps of:

a) a satellite determining whether volunteers for handoff are needed;

b) the satellite repeating step (a) until a number of volunteers for handoff is greater than zero;

c) a satellite transmitting information to a plurality of subscriber units requesting the number of the volunteers for handoff;

d) the subscriber units checking for a strong neighbor cell;

e) the subscriber units making a volunteer handoff request to the satellite for the strong neighbor cell if the strong neighbor cell is found in step (d); and f) transferring communication to the strong neighbor cell if the volunteer handoff request is accepted.

* * * * *